(12) United States Patent
Shin et al.

(10) Patent No.: US 11,202,204 B2
(45) Date of Patent: Dec. 14, 2021

(54) APPARATUS AND METHOD FOR PROVIDING AND MANAGING SECURITY INFORMATION IN COMMUNICATION SYSTEM

(71) Applicant: Samsung Electronics Co., Ltd., Suwon-si (KR)

(72) Inventors: In-Young Shin, Seoul (KR); Eun-Tae Won, Gimpo-si (KR); Jong-Hyo Lee, Yongin-si (KR); Soo-Yeon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/626,132

(22) PCT Filed: Jun. 20, 2018

(86) PCT No.: PCT/KR2018/006952
§ 371 (c)(1),
(2) Date: Dec. 23, 2019

(87) PCT Pub. No.: WO2018/236139
PCT Pub. Date: Dec. 27, 2018

(65) Prior Publication Data
US 2020/0128401 A1    Apr. 23, 2020

(30) Foreign Application Priority Data

Jun. 23, 2017 (KR) .................. 10-2017-0080018

(51) Int. Cl.
*H04W 12/00* (2021.01)
*H04W 12/61* (2021.01)
*H04W 12/71* (2021.01)

(52) U.S. Cl.
CPC ........... *H04W 12/61* (2021.01); *H04W 12/71* (2021.01)

(58) Field of Classification Search
CPC ..... H04L 63/08; H04L 9/088; H04L 2209/84; H04W 12/47
See application file for complete search history.

(56) References Cited

U.S. PATENT DOCUMENTS

| 6,728,880 B1 | 4/2004 | Sites |
| 2006/0107042 A1 | 5/2006 | Kohmoto |

(Continued)

FOREIGN PATENT DOCUMENTS

| CN | 103313241 A | 9/2013 |
| CN | 103366430 A | 10/2013 |

(Continued)

OTHER PUBLICATIONS

Extended European Search Report dated Apr. 23, 2020, issued in European Patent Application No. 18821646.9.

(Continued)

*Primary Examiner* — Ellen Tran
(74) *Attorney, Agent, or Firm* — Jefferson IP Law, LLP

(57) ABSTRACT

The present disclosure relates to a technology for a sensor network, machine to machine (M2M) communication, machine type communication (MTC), and Internet of things (IoT). The present disclosure relates to an operation method of a first device in a communication system, the operation method comprising a step of receiving, from a server, security information of a second device associated with the first device, wherein the security information includes a first parameter associated with an operation of the second device, and attribute information associated with the first parameter.

14 Claims, 14 Drawing Sheets

(56) References Cited

U.S. PATENT DOCUMENTS

| | | | |
|---|---|---|---|
| 2008/0061925 A1 | 3/2008 | Bergerhoff et al. | |
| 2014/0120905 A1 | 5/2014 | Kim | |
| 2016/0318481 A1* | 11/2016 | Penilla | B60L 53/80 |
| 2017/0134382 A1* | 5/2017 | Darnell | H04W 12/041 |
| 2017/0347266 A1* | 11/2017 | Petel | H04L 9/3271 |
| 2017/0349142 A1* | 12/2017 | Krishnan | G07C 9/0069 |
| 2018/0076958 A1 | 3/2018 | Narimoto et al. | |

FOREIGN PATENT DOCUMENTS

| | | |
|---|---|---|
| CN | 105976466 A | 9/2016 |
| JP | 2016-220098 A | 12/2016 |
| KR | 10-1031490 B1 | 4/2011 |
| KR | 10-1375946 B1 | 3/2014 |
| KR | 10-2016-0064690 A | 6/2016 |
| KR | 10-1733453 B1 | 5/2017 |

OTHER PUBLICATIONS

Chinese Office Action dated Aug. 20, 2021, issued in Chinese Patent Application No. 201880042047.0.

* cited by examiner

APPARATUS AND METHOD FOR PROVIDING AND MANAGING SECURITY INFORMATION IN COMMUNICATION SYSTEM

CROSS-REFERENCE TO RELATED APPLICATION(S)

This application is a U.S. National Stage application under 35 U.S.C. § 371 of an International application number PCT/KR2018/006952, filed on Jun. 20, 2018, which is based on and claimed priority of a Korean patent application number 10-2017-0080018, filed on Jun. 23, 2017, in the Korean Intellectual Property Office, the disclosure of which is incorporated by reference herein in its entirety.

BACKGROUND

1. Field

The present disclosure relates to an apparatus and method for providing and managing security information in a communication system.

2. Description of the Related Art

The Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has emerged.

As technology elements, such as "sensing technology", "wired/wireless communication and network infrastructure", "service interface technology", and "security technology" have been demanded for IoT implementation, sensor networks, machine-to-machine (M2M) communication, machine type communication (MTC), and so forth have been recently researched.

Such an IoT environment may provide intelligent Internet technology services that create a new value for human life by collecting and analyzing data generated among connected things. IoT may be applied to a variety of fields including smart homes, smart buildings, smart cities, smart cars or connected cars, smart grids, health care, smart appliances and advanced medical services through convergence and combination between existing information technology (IT) and various industrial applications.

The automobile industry has developed various types of key technologies and has provided convenience to drivers by using the developed key technologies.

Firstly, a "turn-key starter" technology has been developed where a door of a vehicle is opened and the vehicle starts up using a mechanical key, and then a "remote keyless entry" technology has been developed where the door of the vehicle may be opened and closed, and the vehicle may start up without using the mechanical key. This remote keyless entry technology is combined with an immobilizer technology, and the vehicle may start up only if a unique password between a key and the vehicle is matched according to use of the immobilizer technology.

Recently, a passive start and entry (PASE) technology has been developed, and a key to which the PASE technology is applied is a smart key. In the case of the smart key, unlike a conventional button-type wireless key, in which a driver needs to press the button of the key after the driver takes the key out of a bag, the driver can open a door of a vehicle without taking the key out of the bag, and the driver presses a button instead of turning the key to start up the vehicle thereby starting up the vehicle. The smart key is a key technology where a vehicle does not start up if there is no an authorized key near a driver's seat and a steering wheel does not move, thereby preventing vehicle theft, and has evolved into various forms.

Meanwhile, a key has been developed in a form of being integrated into a mobile terminal, for example, a smart phone using a wireless communication technology, such as near field communication (NFC) technology. That is, as a digitized virtual key, i.e., a digital key is inserted into the smart phone, and a driver does not need to carry the key as the digital key is inserted into the smart phone.

Further, a digital key is currently used for a 'carsharing' service that shares a vehicle. A user using the car sharing service receives and stores a virtual key from a car sharing company through a smart phone application. Then, the user using the car sharing service may use a booked vehicle using the received virtual key.

As described above, in the automobile industry, key technologies have been developed in a form of a mechanical key to a remote control key, the remote control key to a smart key, and the smart key to a digital key. So, the concept of owning a key according to a combination of a vehicle and a smart phone will disappear.

The emergence of a digital key plays an important role in expanding a carsharing service, and it is to be expected that expansion of a carsharing market changes the industry with the concept of sharing a vehicle along with an era of autonomous vehicles rather than owning vehicles in the future.

As such, use of a digital key is a significant improvement in user convenience and industrial effects, but concern for security thereof is also raised. That is, since the digital key basically requires a combination with a mobile terminal, the digital key may be exposed to malicious use such as hacking, and/or the like. So, there is a need for a scheme of providing and using a reliable digital key.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for providing and managing security information in a communication system.

An embodiment of the present disclosure proposes an apparatus and method for enhancing reliability of security information in a communication system.

An embodiment of the present disclosure proposes an apparatus and method for managing a valid duration of security information in a communication system.

According to an embodiment of the present disclosure, an operation method of a first device in a communication system is proposed, and the operation method comprises receiving, from a server, security information of a second device related to the first device, and the security information includes a first parameter related to an operation of the second device, and property information related to the first parameter.

According to an embodiment of the present disclosure, an operation method of a first device in a communication system is proposed, and the operation method comprises detecting status of a second device, checking applet accessibility of the first device, performing a check process which is based on property information related to a first parameter related to an operation of the second device based on the checked applet accessibility, and checking validity of the property information related to the first parameter.

According to an embodiment of the present disclosure, a first device in a communication system is proposed, and the first device comprises a processor configured to receive, from a server, security information of a second device related to the first device, and the security information includes a first parameter related to an operation of the second device, and property information related to the first parameter.

According to an embodiment of the present disclosure, a first device in a communication system is proposed, and the first device comprises a communication module configured to transmit/receive a signal from a second device, and a processor configured to detect status of a second device, check applet accessibility of the first device, perform a check process which is based on property information related to a first parameter related to an operation of the second device based on the checked applet accessibility, and check validity of the property information related to the first parameter.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

An embodiment of the present disclosure may provide and manage security information in a communication system.

An embodiment of the present disclosure may enhance reliability of security information in a communication system.

An embodiment of the present disclosure may manage a valid duration of security information in a communication system.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
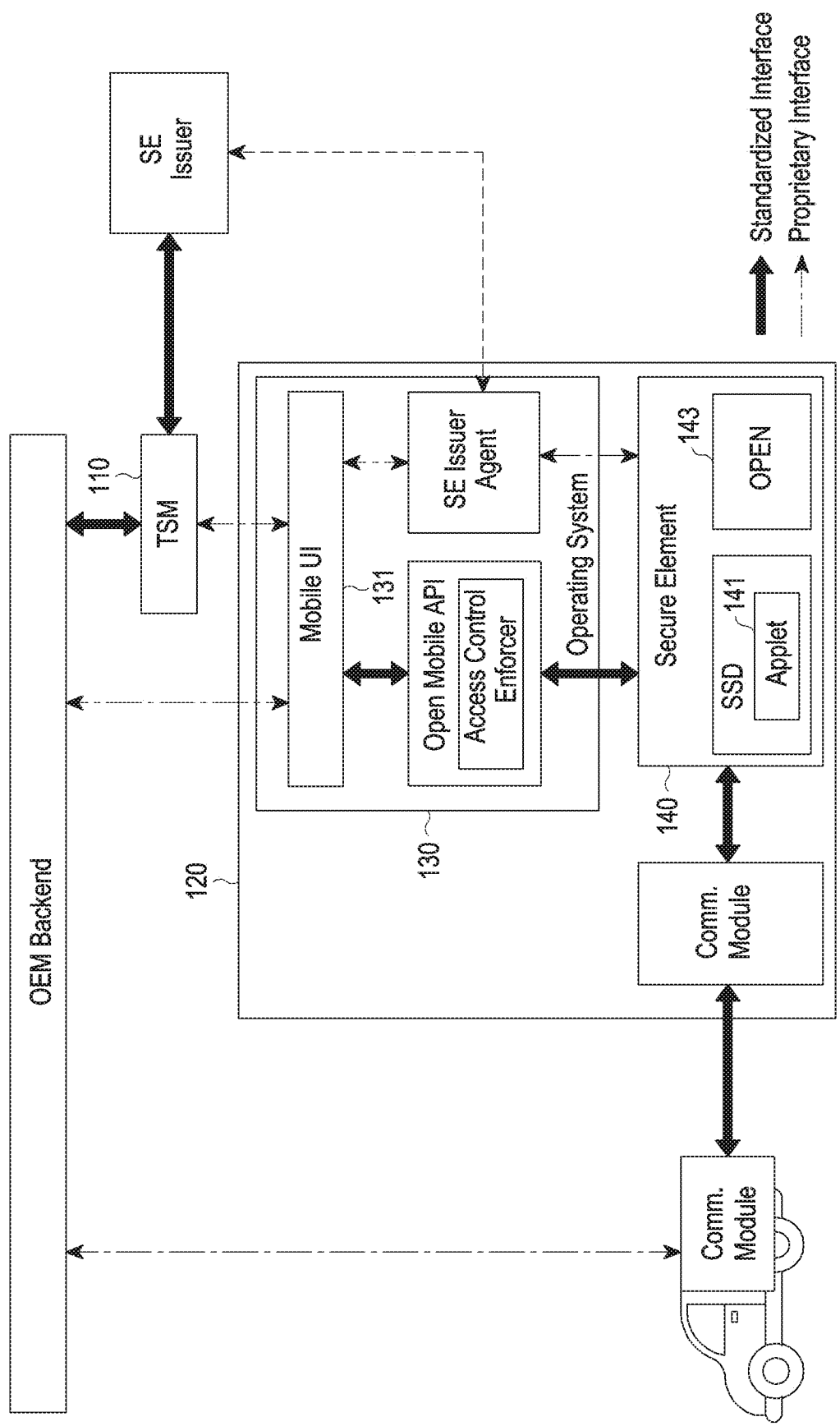
FIG. 1 schematically illustrates an inner structure of a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for providing and managing security information in a communication system.

An embodiment of the present disclosure proposes an apparatus and method for enhancing reliability of security information in a communication system.

An embodiment of the present disclosure proposes an apparatus and method for managing a valid duration of security information in a communication system.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

For convenience, in various embodiments of the present disclosure, it will be assumed that security information includes, for example, a digital key and property information related to the digital key, however, it is to be understood that an apparatus and method proposed in the present disclosure may be applied to other security information as well as the digital key and the property information related to the digital key.

In various embodiments of the present disclosure, it will be assumed that an apparatus for transmitting or receiving security information is, for example, a smart device or a vehicle, however, it is to be understood that apparatuses other than the smart device or the vehicle may transmit or receive the security information. In various embodiments of the present disclosure, the smart device may be a mobile station (MS). In various embodiments of the present disclosure, the term MS may be interchangeable with the term user equipment (UE), terminal, device, wireless device, mobile device, and/or the like.

Firstly, an embodiment of the present disclosure proposes a scheme of preventing use of a digital key if the valid time of the digital key has elapsed after the digital key is issued in order to prevent malicious use of a vehicle, and this may enhance reliability of the digital key.

In a case where a network connection between a vehicle and a smart device is not established, where a connection between the vehicle and the smart device is maliciously released, where the smart device operates at an operation mode in which the network connection may not be established such as an airplane mode, or where the smart device is located in a shadow area, it is impossible for the smart device to acquire reliable current time information for use of a digital key. So, the smart device needs to acquire time information from a source which guarantees continuity and reliability.

At present, no separate property information is defined for the digital key, so an embodiment of the present disclosure proposes property information such as valid time of the digital key. Further, an embodiment of the present disclosure proposes a scheme of preventing use of the digital key and notifying that the valid time of the digital key elapsed in a case where the valid time of the digital key elapsed.

In drawings used for explaining various embodiments of the present disclosure, it will be noted that a smart device is illustrated as "mobile phone", and a controller included in the smart device is illustrated as "OPEN".

An inner structure of a communication system according to an embodiment of the present disclosure will be described with reference to FIG. 1.

FIG. 1 schematically illustrates an inner structure of a communication system according to an embodiment of the present disclosure.

Referring to FIG. 1, the communication system includes a trusted service manager (TSM) 110 and a smart device 120. The smart device 120 includes a mobile user interface (UI) unit 130 and an embedded secure element (eSE) 140. Here, an eSE is just an example of a secure element (SE), and the SE may include a universal integrated circuit card (UICC), a secure digital (SD), and/or the like as well as the eSE.

The TSM 110 is an entity which manages a digital key, and may be implemented as, for example, a server form. The TSM 110 enables service providers to remotely distribute and manage contactless applications of the service providers by allowing access to smart devices, e.g., a secure element included in the smart devices, e.g., an eSE. For convenience, a service provider will be referred to as "OEM".

The smart device 120 includes an operating system module 130, an eSE 140, and a communication module (not shown in FIG. 1).

The operating system module 130 includes a mobile user interface (UI) (Mobile UI) 131. The Mobile UI 131 represents an interface between an OEM or a TSM and the smart device 120.

The eSE 140 includes an applet 141 and a controller 143. The eSE 140 is a secure storage device included in the smart device 120. The smart device 120 includes the eSE 140 in FIG. 1, however, it is to be understood that the smart device 120 may include a universal integrated circuit card (UICC) secure element (SE) instead of the eSE 140. The applet 141 represents a small application run within the eSE 140, and may be loaded or installed by the TSM 110 or an SE Issuer (not shown in FIG. 1). The controller 143 controls the overall operation related to a digital key according to an embodiment of the present disclosure.

The communication module represents a short range communication device used for transmitting and/or receiving a signal between a vehicle and the smart device 120. The communication module may transmit and/or receive the signal between the vehicle and the smart device 120 based on, for example, a near field communication (NFC) scheme. In an embodiment of the present disclosure, it has been assumed that the communication module uses the NFC scheme, however, it is to be understood that various short range communication schemes may be used as well as the NFC scheme.

Although each entity includes a plurality of modules in FIG. 1, it is to be understood that modules included in each entity may be implemented with at least one processor.

An inner structure of a communication system according to an embodiment of the present disclosure has been described with reference to FIG. 1, and a process of provisioning digital key information in a communication system according to an embodiment of the present disclosure will be described with reference to FIG. 2.

Figure 2:
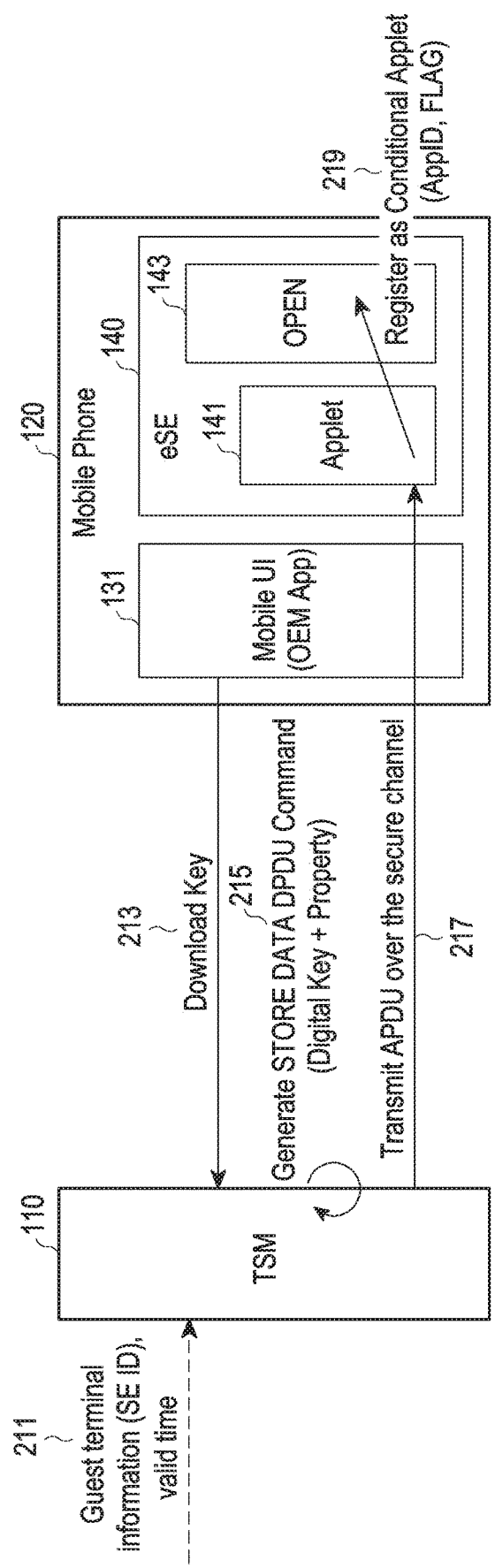
FIG. 2 schematically illustrates a process of provisioning digital key information in a communication system according to an embodiment of the present disclosure.

FIG. 2 schematically illustrates a process of provisioning digital key information in a communication system according to an embodiment of the present disclosure.

Referring to FIG. 2, a TSM 110 stores an SE ID and digital key information of a guest terminal, e.g., a vehicle (operation 211). The digital key information includes a digital key and property information related to the digital key, the property information related to the digital key may include, for example, valid time of the digital key, the digital key information will be described below, and a detailed description thereof will be omitted herein. The digital key information stored at the TSM 110 may be received from, for example, an OEM, and a detailed description of an operation in which the TSM 110 receives the digital key information from the OEM will be omitted.

It will be assumed that a Mobile UI 131 has been installed previously and bounded to an SE Issuer (SEI) agent before service deployment such as applet installation, and an operation related to eligibility and verification has been performed already.

An SE ID is provided by a Mobile UI application which has been installed at a smart device 120 previously, and has been bounded to the SE 140 previously, so the Mobile UI 131 acquires the SE ID. The Mobile UI 131 requests SE applet provisioning from the OEM. Here, the acquired SE ID is transmitted when the SE applet provisioning is requested. The OEM notifies to the TSM 110 that service distribution is to be started upon receiving the SE applet provisioning request from the Mobile UI 131. The TSM 110 transmits the received notification to the SEI. The OEM requests the TSM 110 to distribute a service which transfers all commands in order to distribute the service. The commands include an install service command, a personalize service command, an active service command, and/or the like. Due to this, performance of applet loading, installation, and a personalized procedure has been completed between the TSM 110 and the smart device 120 (operation 213).

The TSM 110 performs a series of activities such as loading of a digital key application executable load file, generation of an instance, and personalization of an application and makes the application selectable. The TSM 110 generates STORE DATA application protocol data unit (APDU) command including the stored digital key information of the guest terminal in order to store the digital key information at the smart device 120 (operation 215) and transmits the generated STORE DATA APDU command to an applet 141 through a secure channel (operation 217).

Upon receiving the STORE DATA APDU command including the digital key information from the TSM 110, the applet 141 stores the digital key information, and registers the applet 141 at a controller 143 as a conditional applet (operation 219). At this time, a procedure of registering the applet 141 as the conditional applet is performed based on an applet ID of the applet 141 and a flag. If a value of the flag is set to, for example, "1", it means that the applet 141 is the conditional applet. The flag is a flag indicating whether a specific applet is a conditional applet.

Meanwhile, digital key information newly proposed in an embodiment of the present disclosure, i.e., digital key information including a digital key and property information related to the digital key will be described below.

A format of digital key information is expressed in Table 1, and the digital key information may be implemented with, for example, a data grouping identifier (DGI) format.

TABLE 1

| Tag | Length | Data/Description | Presence |
|---|---|---|---|
| 'XXXX' | Variable | Use rule (Restrictive License) | Mandatory |
| 'XX' | 1-16 | License Serial Number | Mandatory |
| 'XX' | Variable | Issuer ID (TSM) | Mandatory |
| 'XXXX' | 1-16 | Subject Identifier: time limitation, GeoFencing | Mandatory |
| 'XX' | 1 | Category {'00' allowed duration (default), '01' limited time, '10' expiration time . . . ,} allowed duration: 20170301 19:30 (may be used until 19:30 on March 1, 2017) expiration time: 12:00:00 (12 hours from a time point when digital key is initially used) limited time: 08:00, 20:00 (digital key may be used during only 08:00~20:00) allowed radius: within radius of 2 km (in case of Valet) allowed area: Seocho | Mandatory |
| 'XX' | Variable | Key Object ID (ID of connected digital key) | Mandatory |
| 'XX' | 7 | Expiration Value Category 00: YYYYMMDD HHMMSS Category 01: HHMMSS HHMMSS Category 10: HHMMSS | Conditional |
| 'XX' | Variable | System Time Information: used for mapping clock to actual time | |
| 'XX' | Variable | Signature | Mandatory |

In Table 1, Restrictive License indicates a use rule, and indicates a DGI for validity check. Issuer ID indicates information related to a TSM which issues a corresponding license, e.g., a unique ID of a TSM. Subject Identifier indicates a limited property, and the limited property may include, for example, at least one of limited time, a limited location, a limited speed, and/or the like. Category indicates a criterion for the Subject Identifier. For example, if the Subject Identifier is the limited time, the Category may include at least one of an allowed duration, expiration time, limited time, and/or the like. Key Object ID indicates an ID of an actual digital key. Expiration Value is an actual value which corresponds to the Category and indicates a date, time information, and/or the like. System Time Information is information which is referred to when current time is calculated and includes actual time and system clock information. Signature is a signature value of a TSM which corresponds to the Issuer ID, and is used for identifying a TSM which receives a service.

A format of a STORE DATA APDU command message is expressed below, a STORE DATA APDU command message in which digital key information proposed in an embodiment of the present disclosure is transferred uses, for example, P1, and P1 indicates a criterion control parameter. Especially, in an embodiment of the present disclosure, P1 uses a DGI format, so b5-b4 of P1 is 01 (b5-b4=01).

TABLE 2

| Code | Value | Meaning |
|---|---|---|
| CLA | '80'-'8F', 'C0'-'CF', or 'E0'-'EF' | See section 11.1.4 |
| INS | 'E2' | STORE DATA |
| P1 | 'xx' | Reference control parameter P1 |
| P2 | 'xx' | Block number |
| Lc | 'xx' | Length of data field |
| Data | 'xxxxx . . . ' | Application data and MAC (if present) |
| Le | | Not present |

A process of provisioning digital key information in a communication system according to an embodiment of the present disclosure has been described with reference to FIG. 2, and an example of a process of checking valid time of a digital key in a communication system according to an embodiment of the present disclosure will be described with reference to FIG. 3.

Figure 3:
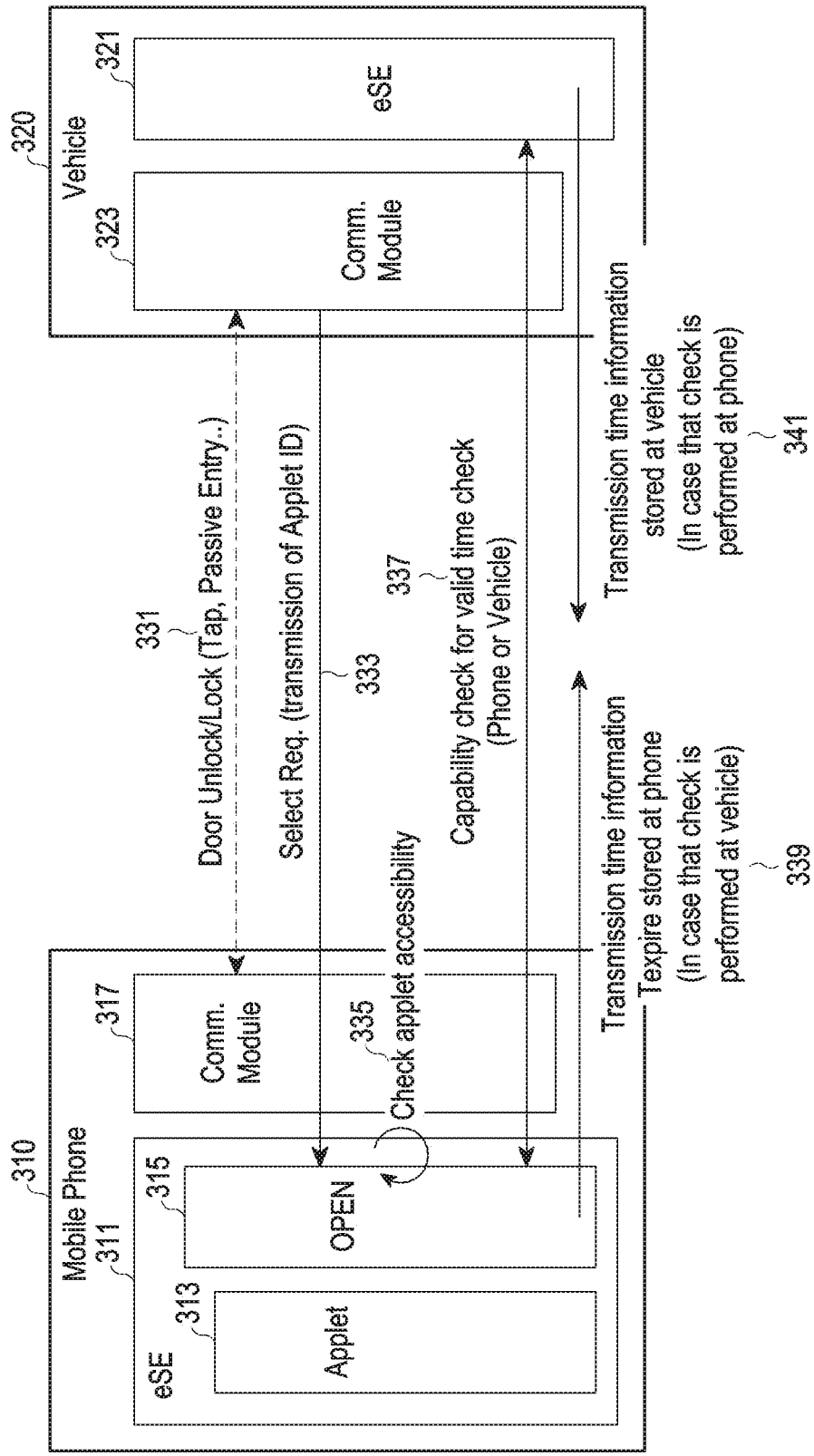
FIG. 3 schematically illustrates an example of a process of checking valid time of a digital key in a communication system according to an embodiment of the present disclosure.

FIG. 3 schematically illustrates an example of a process of checking valid time of a digital key in a communication system according to an embodiment of the present disclosure.

Referring to FIG. 3, the communication system includes a smart device 310 and a vehicle 320. The smart device 310 includes an eSE 311 and a communication module 317, and the eSE 311 includes an applet 313 and a controller 315.

The vehicle 320 includes an eSE 321 and a communication module 323. The communication module 323 represents a short range communication device used for transmitting and/or receiving a signal between the vehicle 320 and the smart device 310. The communication module 323 may transmit and/or receive the signal between the vehicle 320 and the smart device 310 based on, for example, an NFC scheme. In an embodiment of the present disclosure, it has been assumed that the communication module 323 uses the NFC scheme, however, it is to be understood that various short range communication schemes may be used as well as the NFC scheme.

Firstly, it will be assumed that digital key information including a digital key and property information related to the digital key is stored at the smart device 310. The smart device 310 and the vehicle 320 detect that they are on door unlock and/or door lock status through the communication module 317 and the communication module 323, respectively (operation 331). The communication module 323 transmits a select request (Select Req.) message to the controller 315 through the communication module 317 (operation 333). The Select Req. message includes an applet ID. Upon receiving the Select Req. message, the controller 315 checks applet accessibility (operation 335). For example, the controller 315 checks whether an applet which corresponds to the applet ID included in the Select Req. message is a conditional applet. Based on the result of checking the applet accessibility, if the applet which corresponds to the applet ID included in the Select Req. message is the conditional applet, that is, if a value of a flag mapped to the applet ID is set to "1", the smart device 310 and the vehicle 320 perform a capability check process for a check which is based on property information related to a digital key, e.g., a valid time check (operation 337). The capability check process for the valid time check will be described with reference to FIG. 4, and this will be omitted herein.

When the capability check process for the valid time check has been completed, an entity which will perform the valid time check is determined, and the determined entity performs the valid time check. If the determined entity is the vehicle 320, the smart device 310 transmits, to the vehicle 320, time information and valid time information Texpire stored at the smart device 310 (operation 339). The vehicle 320 checks valid time for the digital key based on the time information and the valid time information Texpire which are received from the smart device 310 and performs an operation which corresponds to the result of the valid time check.

If the determined entity is the smart device 310, the vehicle 320 transmits, to the smart device 310, time information stored at the vehicle 320 (operation 341). The smart device 310 checks valid time for the digital key based on the time information received from the vehicle 320 and performs an operation which corresponds to the result of the valid time check.

A process of checking valid time of a digital key in a communication system according to an embodiment of the present disclosure has been described with reference to FIG. 3, and a capability check process for checking valid time of a digital key in a communication system according to an embodiment of the present disclosure will be described with reference to FIG. 4.

Figure 4:
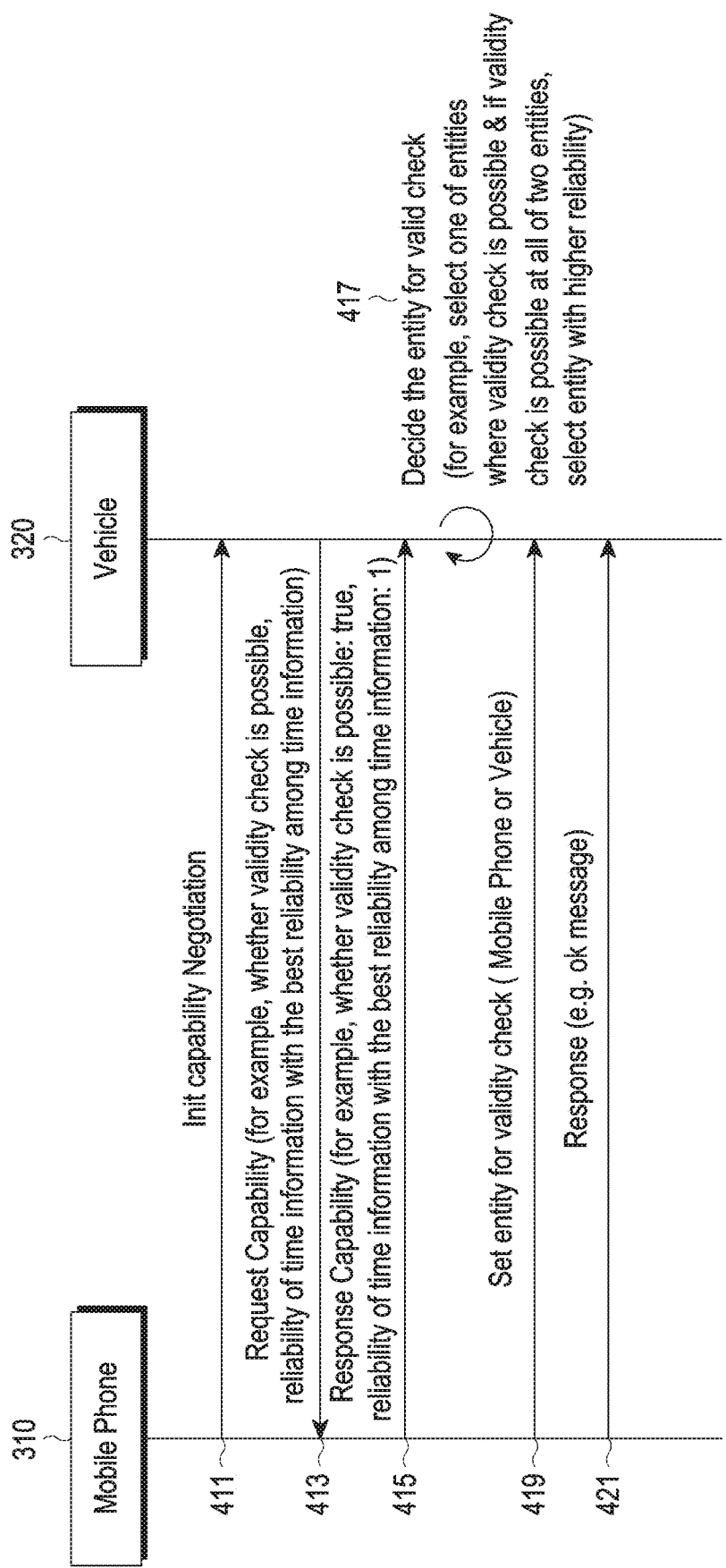
FIG. 4 schematically illustrates a capability check process for checking valid time of a digital key in a communication system according to an embodiment of the present disclosure.

FIG. 4 schematically illustrates a capability check process for checking valid time of a digital key in a communication system according to an embodiment of the present disclosure.

Referring to FIG. 4, if a vehicle 320 has capability to perform a valid time check for a digital key, the vehicle 320 performs the valid time check for the digital key. If the vehicle 320 has no capability to perform the valid time check for the digital key, the vehicle 320 performs a capability negotiation process with a smart device 310 in order to perform the valid time check for the digital key using capability of the smart device 310. This will be described below.

The smart device 310 transmits, to the vehicle 320, an initiate capability negotiation (Init Capability Negotiation) message for the valid time check for the digital key between the smart device 310 and the vehicle 320 (operation 411). Upon receiving the Init Capability Negotiation message from the smart device 310, the vehicle 320 transmits, to the smart device 310, a request capability (Request Capability) message for requesting information related to capability of the smart device 310 (operation 413). The Request Capability message is a message for requesting the information related to the capability of the smart device 310 such as whether the valid time check for the digital key is possible, reliability of time information with the best reliability among time information managed by the smart device 310, and/or the like.

Upon receiving the Request Capability message from the vehicle 320, the smart device 310 detects the information related to the capability of the smart device 310 corresponding to the Request Capability message, and transmits, to the vehicle 320, a response capability (Response Capability) message as a response message to the Request Capability message. The Request Capability message includes, for example, the information related to the capability of the smart device 310 such as whether a valid time check for a digital key is possible, reliability of time information with the best reliability among time information managed by the smart device 310, and/or the like. In an embodiment of the present disclosure, it will be assumed that the valid time check for the digital key is possible, and the reliability of time information with the best reliability among the time information managed by the smart device 310 is "1". So, the Response Capability message includes information indicating that the valid time check for the digital key is possible at the smart device 310, and information indicating that the reliability of time information with the best reliability among the time information managed by the smart device 310 is "1".

Upon receiving the Response Capability message from the smart device 310, the vehicle 320 determines an entity which will check the valid time of the digital key (operation 417). Here, the vehicle 320 detects information related to capability of the vehicle 320, i.e., whether the vehicle 320 is possible to check the valid time of the digital key, and reliability of time information with the best reliability among time information managed by the vehicle 320, and/or the like. Then, the vehicle 320 determines an entity which will check the valid time of the digital key based on the information related to the capability of the vehicle 320 and the information related to the capability of the smart device 310 included in the Response Capability message received from the smart device 310. For example, if all of the vehicle 320 and the smart device 310 are capable of checking the valid time of the digital key, the vehicle 320 determines an entity which manages time information with higher reliability between the vehicle 320 and the smart device 310 as the entity which will check the valid time of the digital key.

The smart device 310 transmits, to the vehicle 320, a Set Entity for Validity Check message which requests to set an entity for the valid time check of the digital key (operation 419). Upon receiving the Set Entity for Validity Check message from the smart device 310, the vehicle 320 transmits a Response message including information related to the determined entity which will check the valid time of the digital key (operation 421). Here, the Response message may be, for example, an OK message.

A capability check process for checking valid time of a digital key in a communication system according to an embodiment of the present disclosure has been described with reference to FIG. 4, and another example of a process of checking valid time of a digital key in a communication system according to an embodiment of the present disclosure will be described with reference to FIG. 5.

Figure 5:
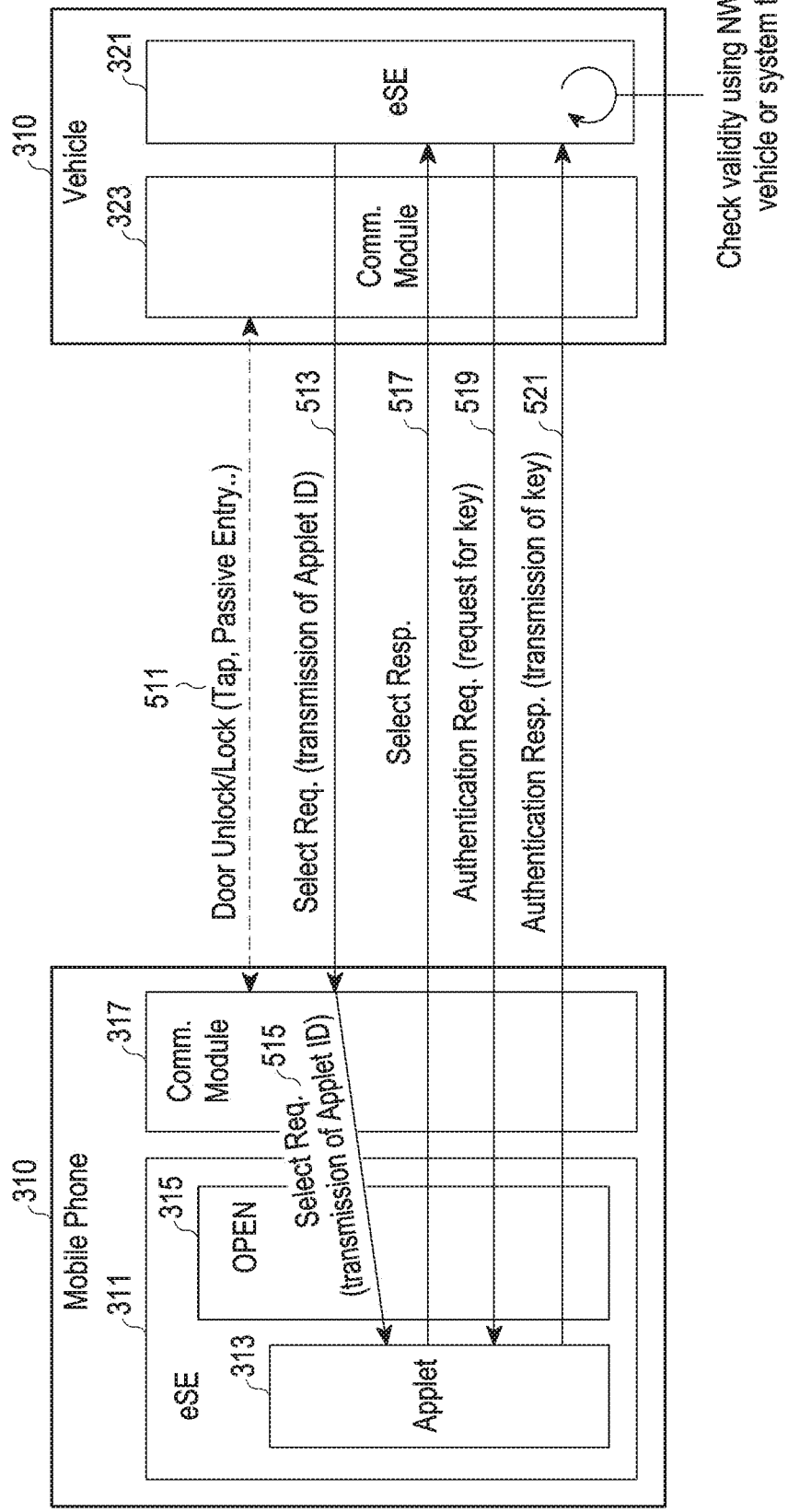
FIG. 5 schematically illustrates another example of a process of checking valid time of a digital key in a communication system according to an embodiment of the present disclosure.

FIG. 5 schematically illustrates another example of a process of checking valid time of a digital key in a communication system according to an embodiment of the present disclosure.

Referring to FIG. 5, it will be noted that a process of checking valid time of a digital key as shown in FIG. 5 is a process of checking valid time of a digital key in a case where a digital key and property information related to the digital key are stored at a vehicle 320. That is, in FIG. 5, it will be assumed that the vehicle 320 is a subject which checks valid time of a digital key, so the vehicle 320 has all of authority and responsibility for the digital key and a related operation. When a smart device 310 downloads digital key information, the vehicle 320 is a connected car which is connected to the smart device 310, so the vehicle 320 downloads the digital key information with the smart device 310. So, the smart device 310 transfers, to the vehicle 320, only a digital key used when a door of the vehicle 310 is opened and closed and checks validity of the digital key, for example, valid time of the digital key.

Firstly, the smart device 310 and the vehicle 320 detect that they are on door unlock and/or door lock status through a communication module 317 and a communication module 323, respectively (operation 511). The communication module 323 transmits a Select Req. message to the controller 315 through the communication module 317 (operation 513). The Select Req. message includes an applet ID. Upon receiving the Select Req. message, the controller 315 transfers the Select Req. message to an applet 313 (operation 515), and the applet 313 transmits, to the vehicle 320, a select response (Select Resp.) message as a response message to the Select Req. message through the communication module 317 (operation 517).

The vehicle 320 receives the Select Resp. message transmitted by the smart device 310 through the communication module 323, so an eSE 321 transmits, to the smart device 310, an authentication request (Authentication Req.) message through the communication module 323 (operation 519). The Authentication Req. message is a message for requesting a digital key. Upon receiving the Authentication Req. message transmitted by the vehicle 320 through the communication module 317, the smart device 310 includes a digital key stored at the smart device 310 into an authentication response (Authentication Resp.) message as a response message to the Authentication Req. message, and transmits, to the vehicle 320, the Authentication Resp. message through the communication module 317 (operation 521).

Upon receiving the Authentication Resp. message transmitted by the smart device 310 through the communication module 323, the vehicle 310 performs a validity check operation for the digital key included in the Authentication Resp. message. That is, the eSE 321 checks valid time for the digital key based on network time, system time, and/or the like.

Another example of a process of checking valid time of a digital key in a communication system according to an embodiment of the present disclosure has been described with reference to FIG. 5, and system time used for a validity check operation for a digital key in a communication system according to an embodiment of the present disclosure will be described with reference to FIG. 6.

Figure 6:
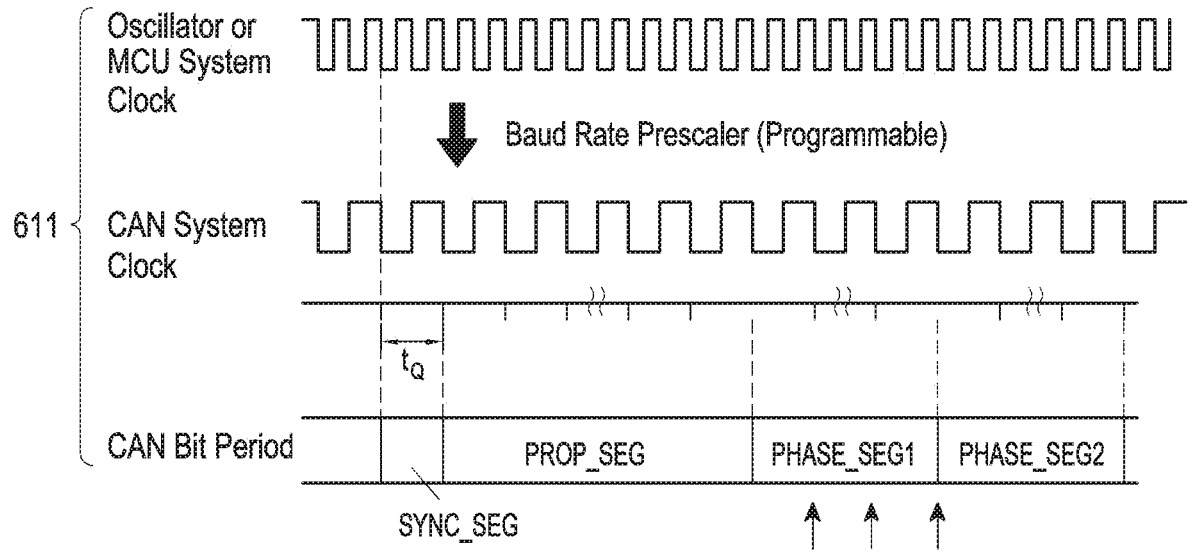
FIG. 6 schematically illustrates system time used for a validity check operation for a digital key in a communication system according to an embodiment of the present disclosure.
Figure 6:
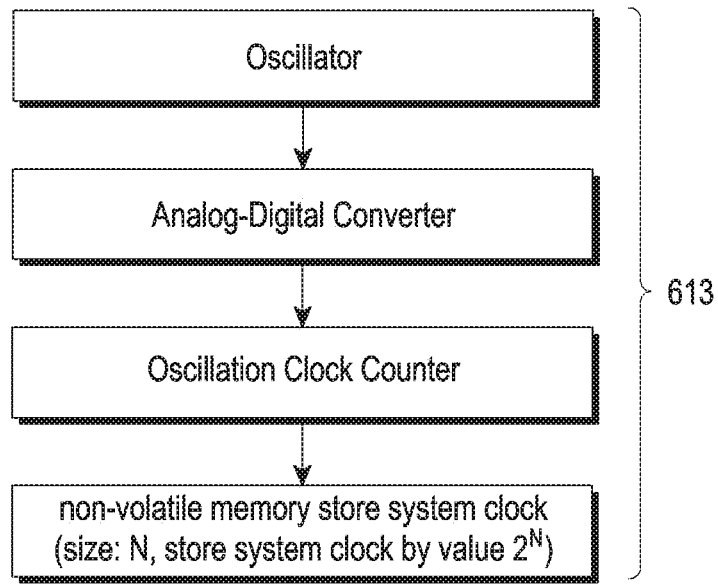

FIG. 6 schematically illustrates system time used for a validity check operation for a digital key in a communication system according to an embodiment of the present disclosure.

Referring to FIG. 6, system time of a vehicle will be described.

An oscillator of a vehicle operates in a status where the vehicle is turned off, and it is difficult to operate the oscillator, so the oscillator may be used for a validity check operation for a digital key.

A relationship between a system clock of an oscillator or a main control unit (MCU) and a controller area network (CAN) system clock is shown in FIG. 6 (611). Here, a clock system is added to the vehicle, and the added clock system may be operated. In this case, the clock system of the vehicle is impossible to be operated by a user, and continuity of the clock system of the vehicle needs to be guaranteed independently of a battery.

That is, an oscillation frequency of an oscillator according to an operation of the oscillator is converted into a digital form in an analog to digital converter (ADC), and an oscillation clock counter counts a system clock of the oscillator based on an output value of the ADC, and stores this at a storage device, e.g., a non-volatile memory. If a size of the non-volatile memory is, for example, N, the non-volatile memory may store the system clock of the oscillator by a value $2^N$ (613). Currently, there is a system clock for a CAN communication in a vehicle, and this is used for synchronization for data transmission/reception among a plurality of Electronic Control Units (ECUs). Further, a counter for counting the system clock is implemented at most vehicles. It is impossible for the counter to be operated by a user, so reliability thereof is high, and continuity of the counter is guaranteed independently of a battery, so the counter may be used for calculating current time.

In addition, battery discharge of a vehicle is such that a current of the vehicle drops below a level sufficient to drive a starting motor of the vehicle and is not completely discharged. Further, transmission is locked after a predetermined time, for example, 5 minutes in order to prevent theft upon battery detachment or full discharge of the battery, so vehicle operation is impossible.

System time used for a validity check operation for a digital key in a communication system according to an embodiment of the present disclosure has been described with reference to FIG. 6, and an example of a validity check operation for a digital key in a communication system according to an embodiment of the present disclosure will be described with reference to FIG. 7.

Figure 7:
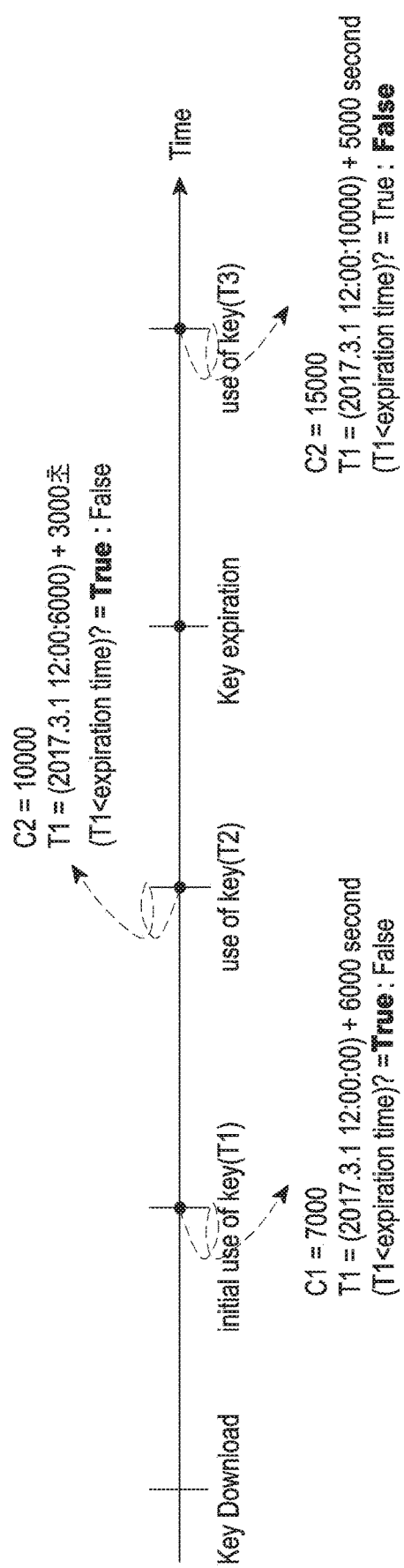
FIG. 7 schematically illustrates an example of a validity check operation for a digital key in a communication system according to an embodiment of the present disclosure.

FIG. 7 schematically illustrates an example of a validity check operation for a digital key in a communication system according to an embodiment of the present disclosure.

Referring to FIG. 7, it will be noted that a validity check operation for a digital key as shown in FIG. 7 is a validity check operation for a digital key which is based on system time of a vehicle and a smart device.

Firstly, actual time is mapped to a clock counter value, i.e., system time of a vehicle. So, mapping information between the actual time and the clock counter value is added to property information related to a digital key included in digital key information. Further, initial mapping is performed using actual time in a case where the digital key is initially used after the digital key is issued, e.g., TSM time and a clock counter value of a vehicle. If the digital key is initially used, a smart device needs to be connected to a network.

Current time is calculated as expressed in Equation 1.

$$T_x = T_{x-1} + F_{time\_converter}(C_x - C_{x-1}) \quad \text{Equation 1}$$

In Equation 1, $T_x$ denotes actual time when a digital key is used x times, and $C_x$ denotes a clock counter value of a vehicle when the digital key is used x times.

For example, a mapped value in FIG. 7 may be expressed as Equation 2.

$$\text{Mapping value} = (2017.3.1\ 12:00:00,\ 1000),\ 1\ \text{Hz}$$
$$\text{(once per second) is assumed} \quad \text{Equation 2}$$

An example of a validity check operation for a digital key in a communication system according to an embodiment of the present disclosure has been described with reference to FIG. 7, and another example of a validity check operation for a digital key in a communication system according to an embodiment of the present disclosure will be described with reference to FIG. 8.

Figure 8:
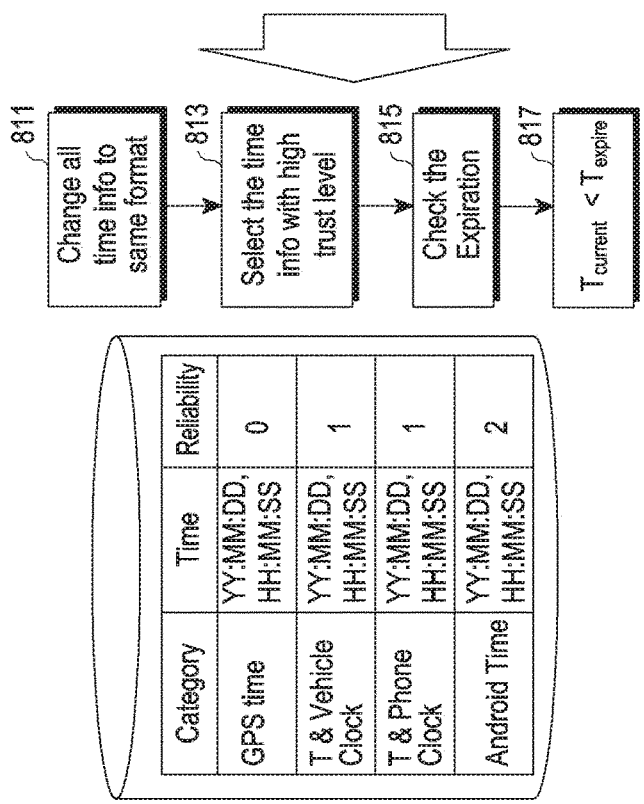
FIG. 8 schematically illustrates another example of a validity check operation for a digital key in a communication system according to an embodiment of the present disclosure.

FIG. 8 schematically illustrates another example of a validity check operation for a digital key in a communication system according to an embodiment of the present disclosure.

Each entity may transmit time information, and a format used for transmitting the time information at this time is shown in FIG. 8. The format as shown in FIG. 8 may be used for each entity to transmit time information at, for example, operations 339 and 341 in FIG. 3. Meanwhile, in an embodiment of the present disclosure, mapping information between actual time and a clock value is additionally included into digital key information for a validity check operation for a digital key, and the validity check operation for the digital key is performed based on this. Here, the mapping information between the actual time and the clock value may be expressed as Table 3, and the mapping information between the actual time and the clock value in Table 3 may correspond to System Time Information included in digital key information as described in Table 1.

TABLE 3

| Tag | Length | Data/Description | Presence |
| --- | --- | --- | --- |
| 'XXXX' | Variable | Time Info | Mandatory |
| 'XX' | 1-16 | Subject Identifier (valid time check) | Mandatory |
| 'XX' | Variable | Time Category - '00' Global, '01' Local | Mandatory |
| 'XX' | 2 | Reliability | Mandatory |
| 'XX' | 1-127 | Time Value Discretionary Data (unspecified format) ex. Clock, Frequency ... | Conditional |
| 'XX' | 1-127 | Discretionary Data (BER-TLV encoded) - in case of a plurality of time values, {Category, Reliability, Time Value} pair | Conditional |

In Table 3, Time Info is a DGI, and used when time information of a smart device and a vehicle is transmitted to an opponent device. In Table 3, Subject Identifier indicates a category for a validity check. For example, the validity check may include a time check, a location check, a speed check, and/or the like. In Table 3, Time category is a sub-category which corresponds to the Subject Identifier, the Subject Identifier indicates a time check, and the Time category indicates a characteristic of time. For example, the Time category indicates whether corresponding time is global time which may be globally used or local time which is valid within a corresponding system.

In Table 3, Reliability is a value indicating reliability of time, and is based on a time table, and the time table may be expressed as Table 4.

TABLE 4

| Type | Description | Reliability |
| --- | --- | --- |
| RealTime | Network time (e.g., server time, time based on GPS, etc.) | 0 |
| SystemTime | clock pulse-based count information, used for managing execution time and deadline, that operates (or valid) within system, synchronizes operation of each component | 1 (manipulation is possible), 2 (manipulation is impossible) |

TABLE 4-continued

| Type | Description | Reliability |
| --- | --- | --- |
| ApplicationTime | time for providing rich execution environment, and user may manipulate it (e.g., time provided by Android) | 3 |

Further, in Table 3, Time Value indicates actual time. If time of a corresponding device is composed of a plurality of time values, a representative of the plurality of time values may be written, and other time values may be additionally written in a pair-form such as (Category, Reliability, Time Value).

In FIG. 8, it will be assumed that a vehicle performs a validity check operation for a digital key. So, the vehicle changes all time information to the same format (operation 811), selects time information with the best reliability (operation 813), checks valid time for the digital key based on the selected time information (operation 815), determines whether the digital key is valid based on current time $T_{current}$ and valid time of the digital key $T_{expire}$, and performs an operation which corresponds to the determined result (operation 817).

Another example of a validity check operation for a digital key in a communication system according to an embodiment of the present disclosure has been described with reference to FIG. 8, and a process of changing status of an applet which is based on digital key information in a communication system according to an embodiment of the present disclosure will be described with reference to FIG. 9.

Figure 9:
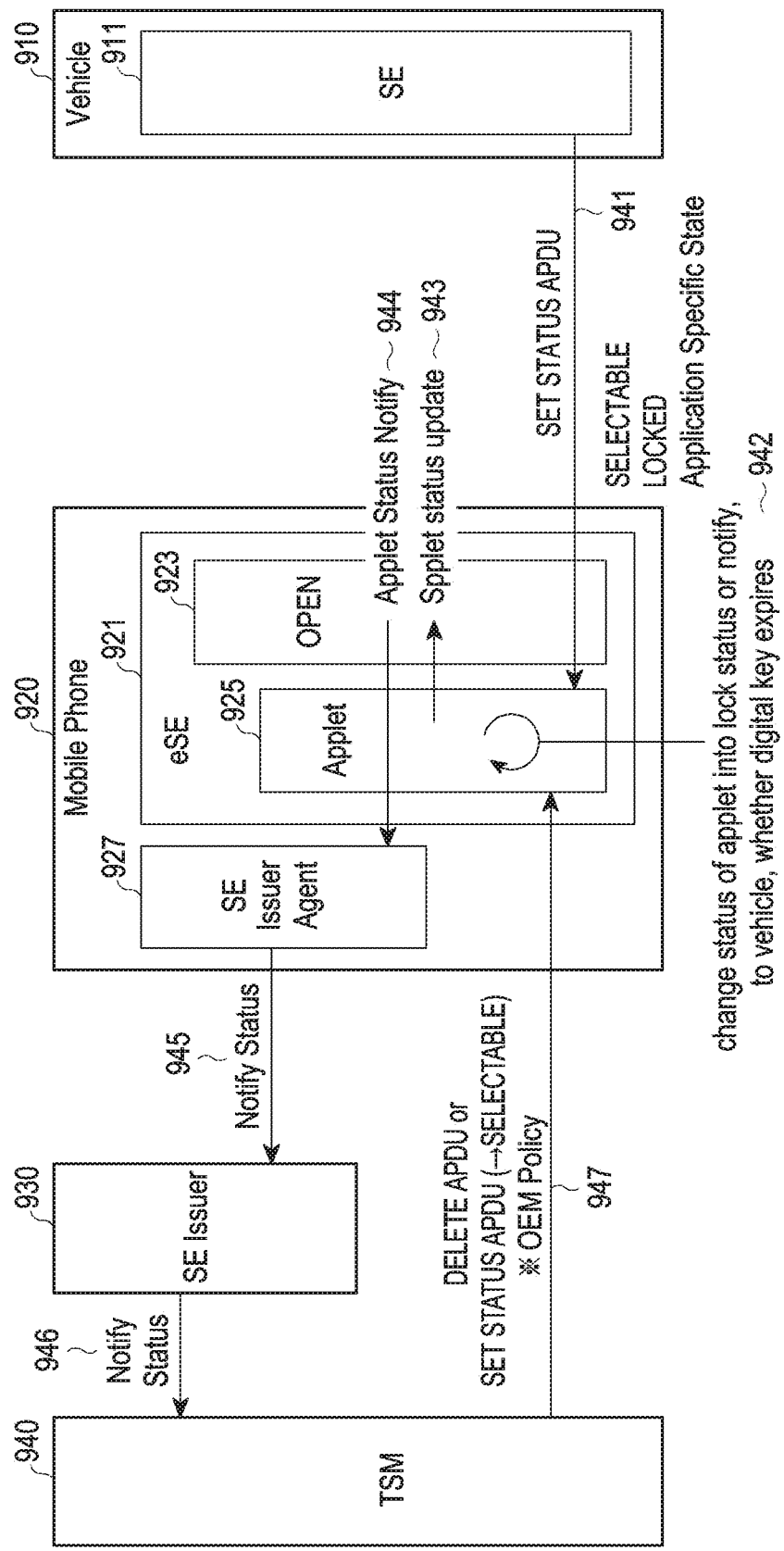
FIG. 9 schematically illustrates a process of changing status of an applet which is based on digital key information in a communication system according to an embodiment of the present disclosure.

FIG. 9 schematically illustrates a process of changing status of an applet which is based on digital key information in a communication system according to an embodiment of the present disclosure.

Referring to FIG. 9, conventionally, when a digital key is downloaded, only an access control function in which an authorized application, e.g., a mobile UI access to an SE is provided, however, an embodiment of the present disclosure provides an access control function for limiting use of the digital key when the digital key is used. An embodiment of the present disclosure provides the access control function for limiting the use of the digital key, so malicious use of a vehicle may be prevented.

Conventionally, only a case that status of an SE is changed is notified to a TSM, however, in an embodiment of the present disclosure, status change of an applet may be informed to the TSM for preventing malicious use of a vehicle.

Firstly, an SE Issuer 930 represents a server infra of an entity which lends an SE storage area, and the SE Issuer 930 manages an SE and defines a global platform (GP). An SE Issuer Agent 927 represents a client infra of an entity which lends an SE storage area.

Upon detecting that status of an SE 911 of a vehicle 910 is changed, the SE 911 of the vehicle 910 transmits a SET STATUS APDU (operation 941). Here, the SET STATUS APDU may indicate one of three states, e.g., a SELECTABLE State, a LOCKED State, and an Application Specific Status, and it will be assumed that a SET STATUS APDU indicating the LOCKED State is transmitted.

Then, an applet 925 of a smart device 920 may change status of the applet 925 into LOCKED status or notify, to the vehicle 910, whether a digital key expires (operation 942). The applet 925 requests applet status update from a controller 923 as the status of the applet 925 is changed (operation 943). The controller 923 transmits, to the SE Issuer Agent 927, an Applet Status Notify message according to the request of the applet status update by the applet 925 (operation 944). The Applet Status Notify message is used for notifying that the status of the applet 925 is changed into the LOCKED state.

Upon receiving the Applet Status Notify message from the controller 923, the SE Issuer Agent 927 transmits, to the SE Issuer 930, a Notify Status message (operation 945). The Notify Status message is used for notifying that the status of the applet 925 is changed into the LOCKED state. Upon receiving the Notify Status message from the SE Issuer Agent 927, the SE Issuer 930 detects that the status of the applet 925 is changed into the LOCKED state, and transmits a Notify Status message to a TSM 940 (operation 946). The Notify Status message is used for notifying that the status of the applet 925 is changed into the LOCKED state. Upon receiving the Notify Status message from the SE Issuer 930, the TSM 940 detects that the status of the applet 925 is changed into the LOCKED state, and transmits, to the applet 925, a DELETE APDU indicating that a digital key will be revoked or a SET STATUS APDU for requesting to set a SELECTABLE state of the applet 925 (operation 947). As the TSM 940 detects that the status of the applet 925 is changed into the LOCKED state, whether to transmit the DELETE APDU indicating that the digital key will be revoked or the SET STATUS APDU for requesting to set the SELECTABLE state of the applet 925 may be determined according to a policy of an OEM.

A process of changing status of an applet which is based on digital key information in a communication system according to an embodiment of the present disclosure has been described with reference to FIG. 9, and a process of detecting a door unlock attempt in applet lock status which is based on digital key information in a communication system according to an embodiment of the present disclosure will be described with reference to FIG. 10.

Figure 10:
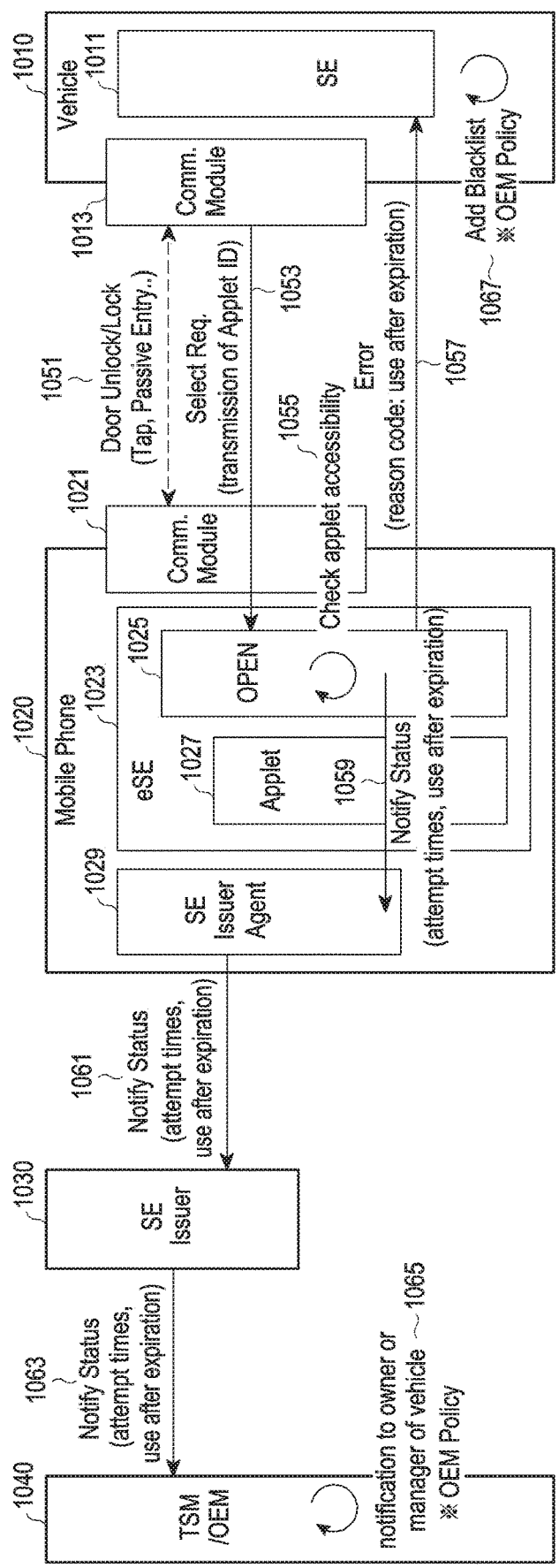
FIG. 10 schematically illustrates a process of detecting a door unlock attempt in applet lock status which is based on digital key information in a communication system according to an embodiment of the present disclosure.

FIG. 10 schematically illustrates a process of detecting a door unlock attempt in applet lock status which is based on digital key information in a communication system according to an embodiment of the present disclosure.

Referring to FIG. 10, an applet is on lock status when valid time of a digital key expires, and door unlock may be attempted on the lock status of the applet. In this case, malicious use of a vehicle may be prevented by informing an OEM and the vehicle of this status, i.e., status on which the door unlock is attempted even though the applet is on the lock status due to expiration of valid time of the digital key.

Firstly, as valid time of a digital key expires, door unlock status is maintained between a smart device 1020 and a vehicle 1010 (operation 1051). Upon detecting the smart device 1020 on the door unlock status, the vehicle 1010 transmits a Select Req. message to a controller 1025 of the smart device 1020 (operation 1053). The Select Req. message includes an applet ID. Upon receiving the Select Req. message, the controller 1025 checks applet accessibility (operation 1055). For example, the controller 1025 checks whether an applet which corresponds to the applet ID included in the Select Req. message is a conditional applet.

Upon detecting an error based on the result of checking the applet accessibility, the controller 1025 transmits an error message to an SE 1011 of the vehicle 1010 (operation 1057). The error message includes a reason code, and the reason code is set to a value indicating use after expiration in FIG. 10.

Upon detecting the error based on the result of checking the applet accessibility, the controller 1025 transmits a Notify Status message to an SE Issuer Agent 1029 (operation 1059). The Notify Status message includes times by which door unlock is attempted to the vehicle 1010, and information indicating use after expiration. Upon receiving the Notify Status message from the controller 1025, the SE Issuer Agent 1029 transmits, to an SE Issuer 1030, a Notify Status message (operation 1061). The Notify Status message includes times by which door unlock is attempted to the vehicle 1010, and information indicating use after expiration.

Upon receiving the Notify Status message from the SE Issuer Agent 1029, the SE Issuer 1030 transmits, to a TSM/OEM 1040, a Notify Status message (operation 1063). The Notify Status message includes times by which door unlock is attempted to the vehicle 1010 and information indicating use after expiration.

Upon receiving the Notify Status message from the SE Issuer 1030, the TSM/OEM 1040 knows the times by which the door unlock is attempted to the vehicle 1010 and the use after the expiration, so the TSM/OEM 1040 notifies a manager of the vehicle 1010 of this situation, that is, the TSM/OEM 1040 notifies to the manager of the vehicle 1010 that there was a unlock attempt to the vehicle 1010 based on the digital key on the status on which the digital key of the vehicle 1010 is expired (operation 1065). Here, the operation in which the TSM/OEM 1040 which receives the Notify Status message from the SE Issuer 1030 notifies, to the owner of the vehicle 1010 or the manager of the vehicle 1010, that there was the unlock attempt to the vehicle 1010 based on the digital key on the status on which the digital key of the vehicle 1010 is expired may be determined according to a policy of the OEM.

Further, the vehicle 1010 may add the smart device 1020 to a blacklist. Whether to add the smart device 1020 to the blacklist may be determined according to a policy of the OEM.

A process of detecting a door unlock attempt in applet lock status which is based on digital key information in a communication system according to an embodiment of the present disclosure has been described with reference to FIG. 10, and a process of revoking a digital key before expiration of the digital key in a communication system according to an embodiment of the present disclosure will be described with reference to FIG. 11.

Figure 11:
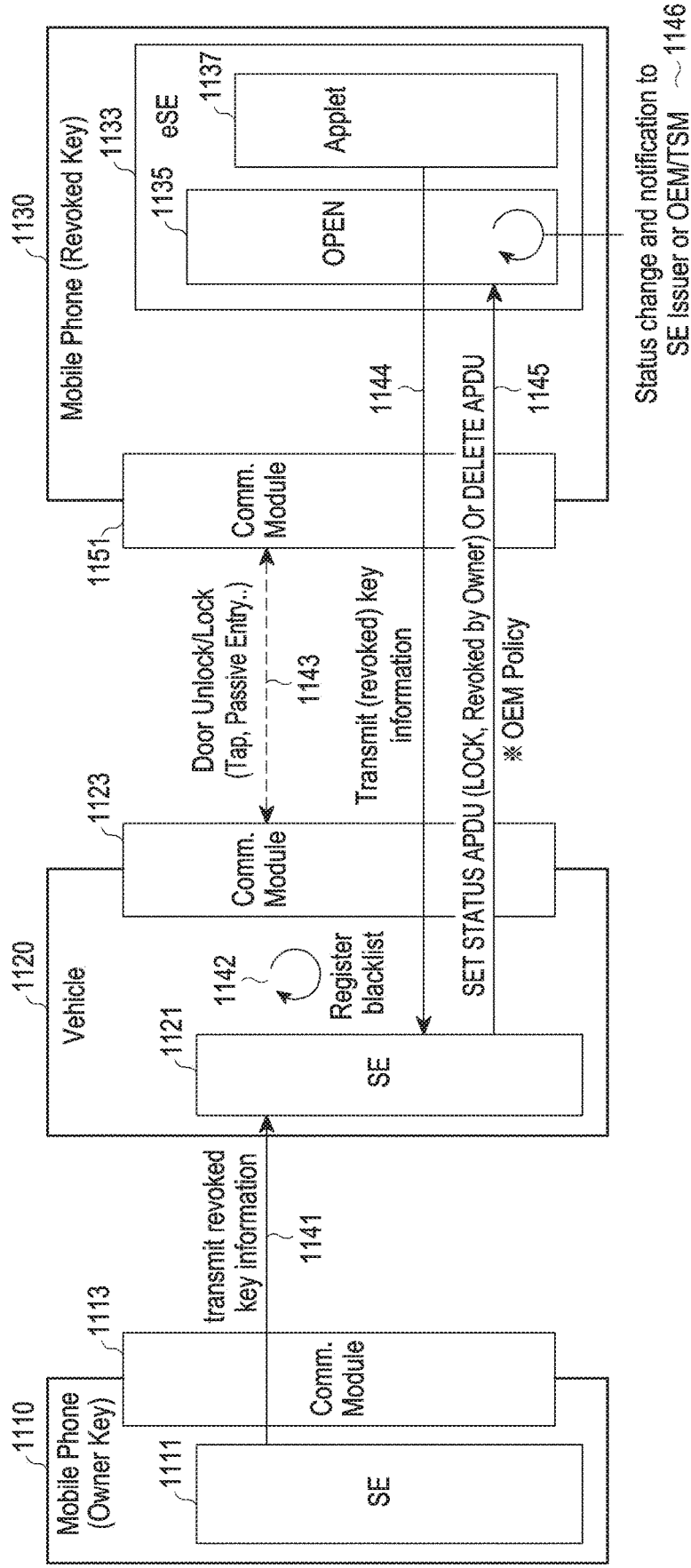
FIG. 11 schematically illustrates a process of revoking a digital key before expiration of the digital key in a communication system according to an embodiment of the present disclosure.

FIG. 11 schematically illustrates a process of revoking a digital key before expiration of the digital key in a communication system according to an embodiment of the present disclosure.

Referring to FIG. 11, a process of revoking a digital key which has been shared before expiration of the digital key, that is, before valid time of the digital key expires may be initiated by a smart device of an owner of a vehicle or a manager of the vehicle. In FIG. 11, the process of revoking the digital key which has been shared before the valid time of the digital key expires will be described, however, a process of revoking a digital key proposed in an embodiment of the present disclosure may be applied even though there is no property information related to the digital key, that is, even though valid time of the digital key is not set.

Firstly, an SE 1111 of a smart device 1110 transmits, to an SE 1121 of a vehicle 1120, Revoke Key information (operation 1141). The Revoke Key information includes digital key information which is to be revoked.

Upon receiving the Revoke Key information from the SE 1111, the SE 1121 registers a digital key included in the digital key information to a blacklist (operation 1142). A communication module 1123 of the vehicle 1120 and a communication module 1119 of a smart device 1130 are on door unlock and/or door lock status (operation 1143).

Meanwhile, an applet 1137 of the smart device 1130 transmits digital key information to the SE 1121 of the vehicle 1120 (operation 1144). The digital key information transmitted from the applet 1137 to the SE 1121 of the vehicle 1120 is identical to digital key information revoked by the smart device 1110. So, the SE 1121 of the vehicle 1120 detects that the digital key information transmitted by the applet 1137 of the smart device 1130 is a revoked digital key, and transmits, to a controller 1135 of the smart device 1130, a SET STATUS APDU or a DELETE APDU (operation 1145). The SET STATUS APDU indicates that status will be changed to lock status, and includes information indicating that a digital key is a key which is revoked by an owner or a manager of the digital key. Whether the SE 1121 of the vehicle 1120 transmits the SET STATUS APDU or the DELETE APDU may be determined according to a policy of an OEM.

Upon receiving the SET STATUS APDU or the DELETE APDU from the SE 1121 of the vehicle 1120, the controller 1135 changes status thereof, and notifies, to an SE Issuer and an OEM/TSM, that the status is changed (operation 1146). Here, whether the controller notifies the OEM/TSM of the status change may be determined according to a policy of the OEM.

A process of revoking a digital key before expiration of the digital key in a communication system according to an embodiment of the present disclosure has been described with reference to FIG. 11, and a process of locking/unlocking a door based on digital key information in a communication system according to an embodiment of the present disclosure will be described with reference to FIGS. 12A and 12B.

Figure 12A:
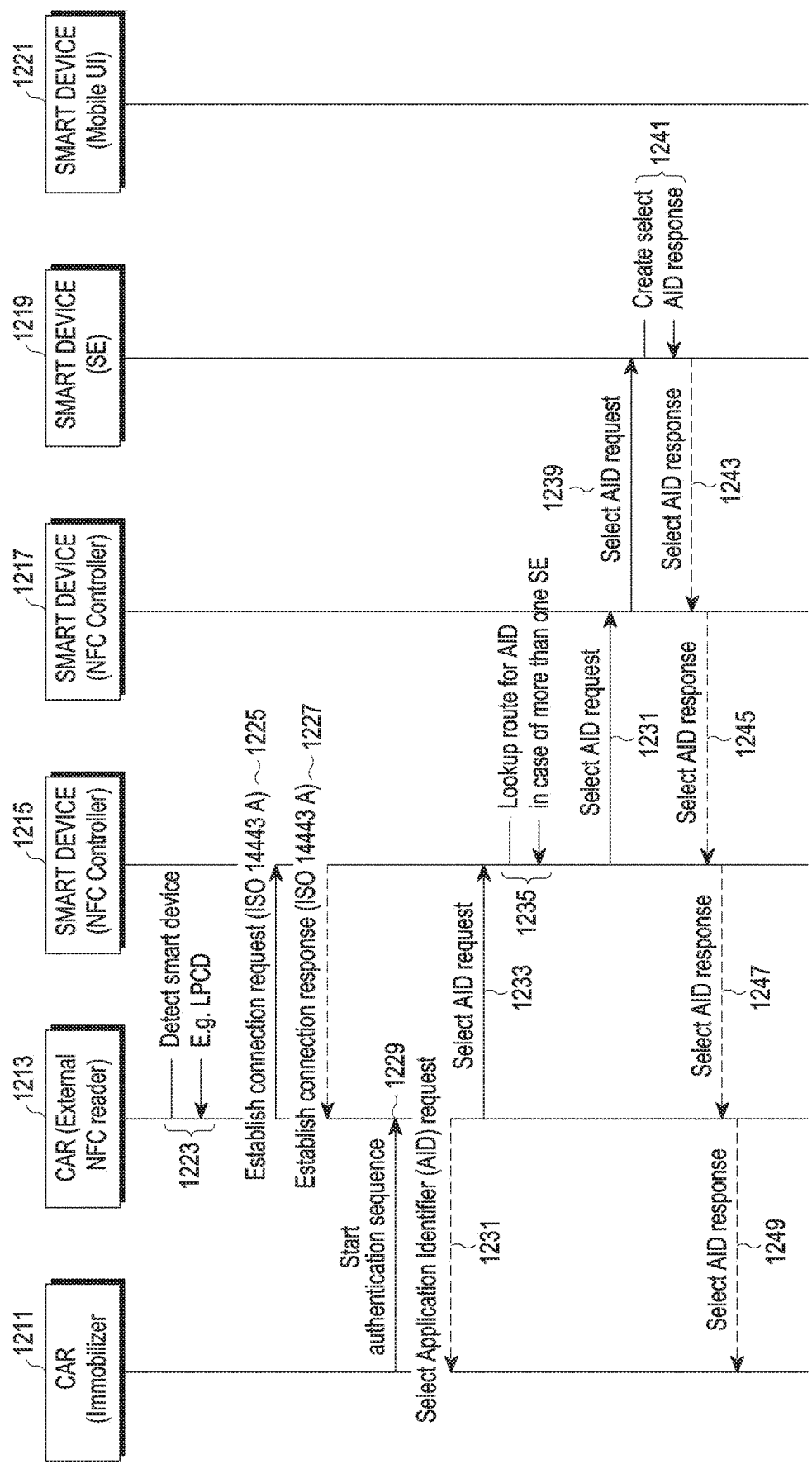
FIGS. 12A and 12B schematically illustrate a process of locking/unlocking a door based on digital key information in a communication system according to an embodiment of the present disclosure.
Figure 12B:
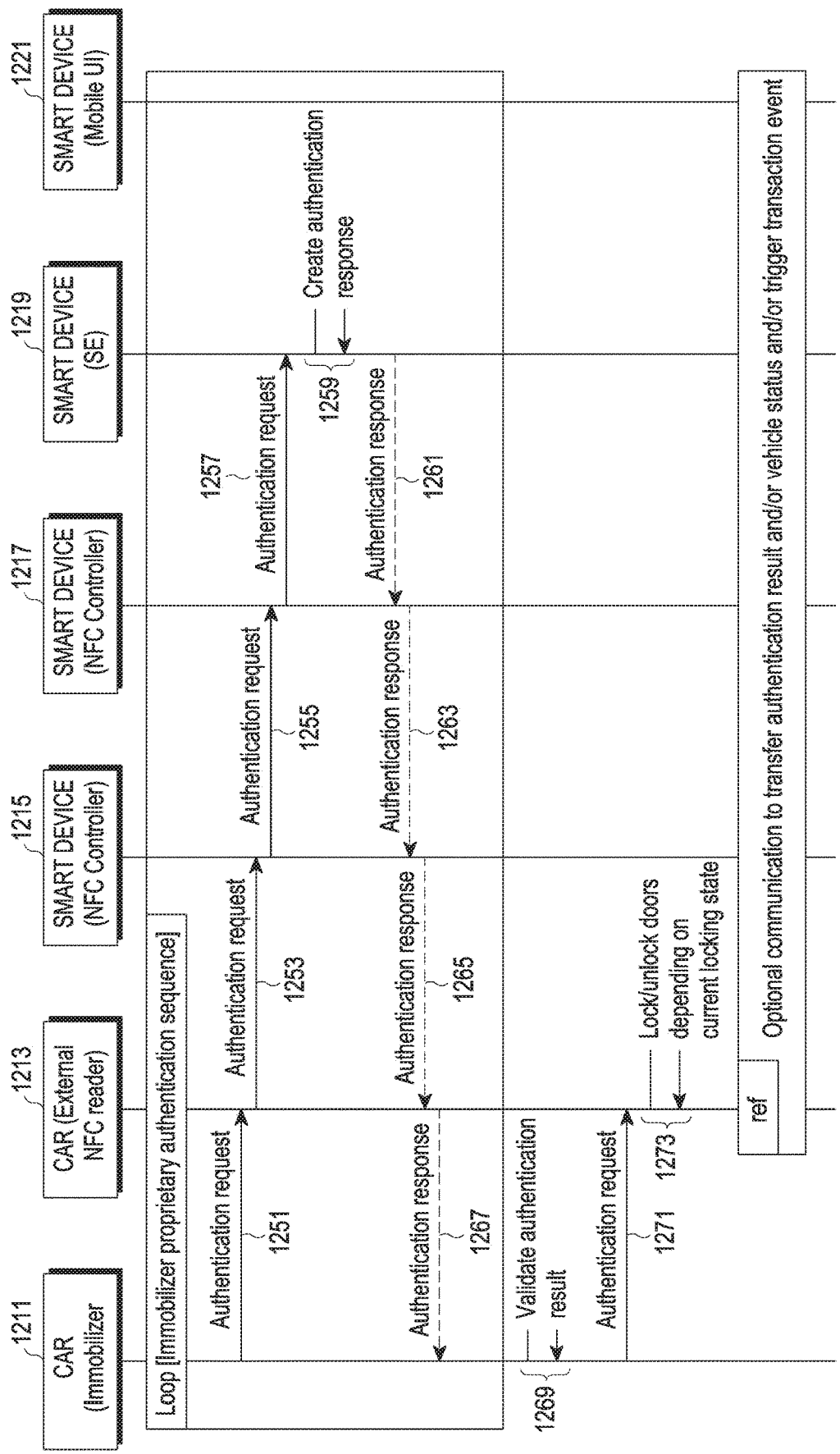

FIGS. 12A and 12B schematically illustrate a process of locking/unlocking a door based on digital key information in a communication system according to an embodiment of the present disclosure.

Referring to FIGS. 12A and 12B, a door lock/unlock process among an immobilizer 1211, an external NFC reader 1213, and an NFC controller 1215 of a vehicle and an NFC controller 1217, an SE 1219, and a Mobile UI 1221 of a smart device is initiated according to the external NFC reader 1213 detecting the smart device (operation 1223). And, an authentication procedure from operation 1225 to operation 1267 is performed among the immobilizer 1211, the external NFC reader 1213, and the NFC controller 1215 and the NFC controller 1217, the SE 1219, and the Mobile UI 1221 of the smart device. Here, the operation 1225 to the operation 1267 is a procedure of authenticating a property of an immobilizer.

When the authentication procedure among the immobilizer 1211, the external NFC reader 1213, and the NFC controller 1215, and the NFC controller 1217, the SE 1219, and the Mobile UI 1221 of the smart device is completed, the immobilizer 1211 verifies the authentication result (operation 1269), and transmits, to the external NFC reader 1213, the authentication result (operation 1271). The external NFC reader 1213 determines current lock status based on the authentication result and locks or unlocks a door based on the determined lock status (operation 1273).

A process of locking/unlocking a door based on digital key information in a communication system according to an embodiment of the present disclosure has been described with reference to FIGS. 12A and 12B, and an operation process which is based on digital key information in a communication system according to an embodiment of the present disclosure will be described with reference to FIG. 13.

Figure 13:
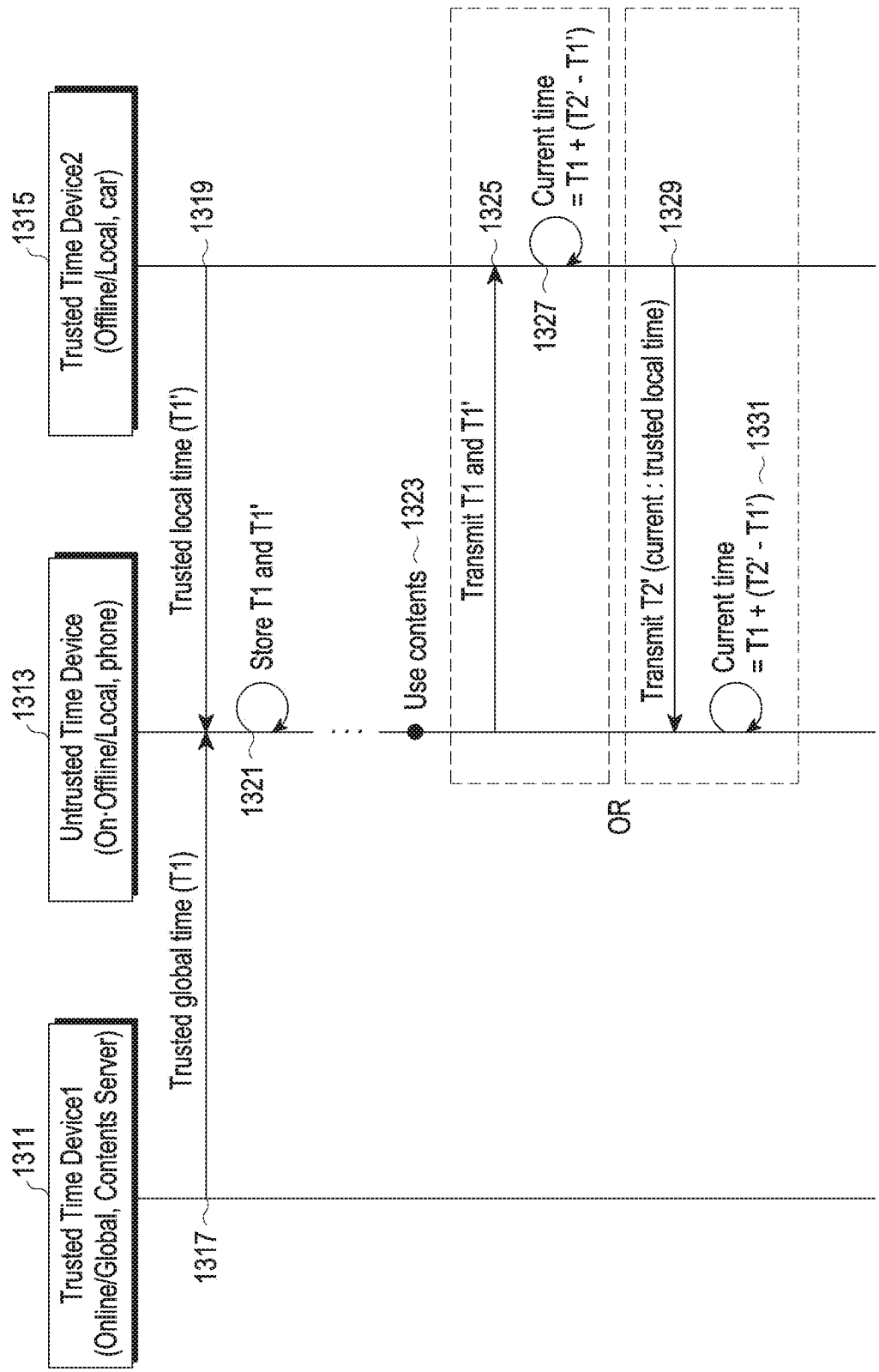
FIG. 13 schematically illustrates an operation process which is based on digital key information in a communication system according to an embodiment of the present disclosure.

FIG. 13 schematically illustrates an operation process which is based on digital key information in a communication system according to an embodiment of the present disclosure.

Referring to FIG. 13, each of a Trusted Time Device 1 1311 and a Trusted Time Device 2 1315 transmits trusted global time to an Untrusted Time Device 1313 (operations 1317 and 1319). Here, time transmitted by the Trusted Time Device 1 1311 is T1, and time transmitted by the Trusted Time Device 2 1315 is T2. The Trusted Time Device 1 1311 is on online status and provides global trusted time such as GMT. The Trusted Time Device 1 1311 may be a service provider, a content server, and/or the like. The Trusted Time Device 2 1315 is on offline status, provides local time, and may be, for example, a vehicle. The Untrusted Time Device 1313 is on online status or offline status, provides local time, and may be, for example, a consumer, e.g., a smart device, e.g., an MS.

So, in an embodiment of the present disclosure, the Untrusted Time Device 1313 is on offline status and may acquire trustable current time using another device which provides trusted local time, i.e., the Trusted Time Device 2 1315. So, the Untrusted Time Device 1313 may use contents regardless of whether the Untrusted Time Device 1313 is on online status or offline status.

So, in an embodiment of the present disclosure, contents accessibility on untrusted status is removed by acquiring reliable local time on offline status.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable) storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An operation method of a first device in a communication system, the operation method comprising:
   transmitting, to a server, information to request to distribute a service related to a second device and the first device;
   receiving, from the server, security information of the second device related to the first device;
   registering a conditional applet to check a validity of the security information; and
   checking the validity of the security information based on the conditional applet,
   wherein the security information includes a first parameter related to an operation of the second device, and property information related to the first parameter,
   wherein the property information includes valid time of the first parameter, and
   wherein the first device is a smart device, and the second device is a vehicle, and if the vehicle has no capability to perform a valid time check for the security information, a capability negotiation process is performed between the vehicle and the smart device in order to perform the valid time check for the security information using capability of the smart device.

2. The operation method of claim 1, wherein the property information includes mapping information between reference time information used in the second device and actual time.

3. The operation method of claim 1, wherein the checking of the validity of the security information based on the conditional applet further comprises:
   detecting status of the second device;
   checking applet accessibility of the first device;
   performing a check process which is based on the property information based on the checked applet accessibility; and
   checking the validity of the security information.

4. The operation method of claim 3,
   wherein the checking of the validity of the security information based on the conditional applet further comprises:
   receiving, from the second device, a select request message including an applet identifier, and
   wherein the checking of the applet accessibility of the first device comprises checking whether an applet which corresponds to the applet identifier is the conditional applet.

5. The operation method of claim 4, wherein the check process which is based on the property information is performed if the applet which corresponds to the applet identifier is the conditional applet.

6. The operation method of claim 5, further comprising:
   receiving, from the second device, time information stored at the second device,
   wherein the property information includes valid time of the first parameter.

7. The operation method of claim 6, wherein the checking the validity of the security information includes checking the valid time of the first parameter based on the received time information.

8. A first device in a communication system, the first device comprising:
   a communication module coupled with a at least one processor,
   wherein the at least one processor is configured to:
      transmit, to a server, information to request to distribute a service related to a second device and the first device,
      receive, from the server, security information of the second device related to the first device,
      register a conditional applet to check a validity of the security information, and check the validity of the security information based on the conditional applet,
   wherein the security information includes a first parameter related to an operation of the second device, and property information related to the first parameter,
   wherein the property information includes valid time of the first parameter, and
   wherein the first device is a smart device, and the second device is a vehicle, and if the vehicle has no capability to perform a valid time check for the security information, a capability negotiation process is performed between the vehicle and the smart device in order to perform the valid time check for the security information using capability of the smart device.

9. The first device of claim 8, wherein the property information includes mapping information between reference time information used in the second device and actual time.

10. The first device of claim 8, wherein the at least one processor is further configured to check the validity of the security information by:
   detecting status of the second device;
   checking applet accessibility of the first device;
   performing a check process which is based on the property information based on the checked applet accessibility; and
   checking the validity of the security information.

11. The first device of claim 10, wherein the at least one processor is further configured to:
   receive, from the second device, a select request message including an applet identifier, and
   check whether an applet which corresponds to the applet identifier is the conditional applet.

12. The first device of claim 11, wherein the check process which is based on the property information is performed if the applet which corresponds to the applet identifier is the conditional applet.

13. The first device of claim 12,
wherein the at least one processor is further configured to receive, from the second device, time information stored at the second device, and
wherein the property information includes valid time of the first parameter.

14. The first device of claim 13, wherein the at least one processor is further configured to check the validity of the security information by checking the valid time of the first parameter based on the received time information.

* * * * *